United States Patent

Chea, Jr.

[11] 4,315,106
[45] Feb. 9, 1982

[54] APPARATUS FOR REGULATING CURRENT SUPPLIED TO A TELEPHONE LINE SIGNAL OF THE TYPE EMPLOYED IN DIGITAL TELEPHONE SYSTEMS

[75] Inventor: Ramon C. W. Chea, Jr., Monroe, Conn.

[73] Assignee: International Telephone and Telegraph Corporation, New York, N.Y.

[21] Appl. No.: 98,104

[22] Filed: Nov. 28, 1979

[51] Int. Cl.³ .......................................... H04M 19/00
[52] U.S. Cl. ............................ 179/16 F; 179/18 FA; 179/70
[58] Field of Search ............ 179/16 A, 16 AA, 16 F, 179/18 FA, 70, 77, 81 R

[56] References Cited
U.S. PATENT DOCUMENTS 4,056,691 11/1977 Freimanis et al. ............. 179/18 FA
4,161,633 7/1979 Treiber ............................ 179/170.2
4,254,305 3/1981 Treiber ............................ 179/16 F Primary Examiner—Bernard Konick
Assistant Examiner—Randall P. Myers
Attorney, Agent, or Firm—John T. O'Halloran; Jeffrey P. Morris

[57] ABSTRACT

Circuit apparatus for supplying a regulated loop current to a two conductor loop telephone line includes first and second line feed resistances, each having one terminal connected to a respective terminal of the telephone line. A differential amplifier has one input connected to the first resistance and a second input connected to the second resistance in common with the resistance connections to the telephone line terminals. One of the resistances has its other terminal connected to the output of an active circuit means, which circuit operates in a feedback path to supply the desired loop current to the line resistance and therefore the telephone line. The input control signal for the active feedback circuit is derived from summing the output signal from the differential amplifier with a reference signal whose magnitude varies according to the length of the telephone line. The feedback path is supplied by the connection between the output of the active feedback circuit and the line resistance as further coupled to an input of the differential amplifier.

11 Claims, 5 Drawing Figures $I_L = \dfrac{V_B}{2R_B + R_L}$ (PRIOR ART)

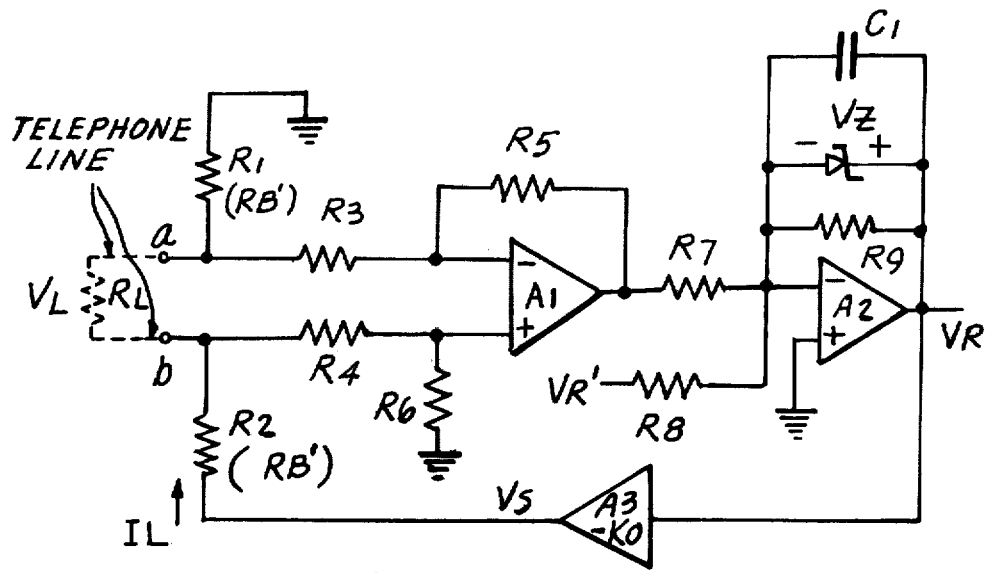
Fig. 4
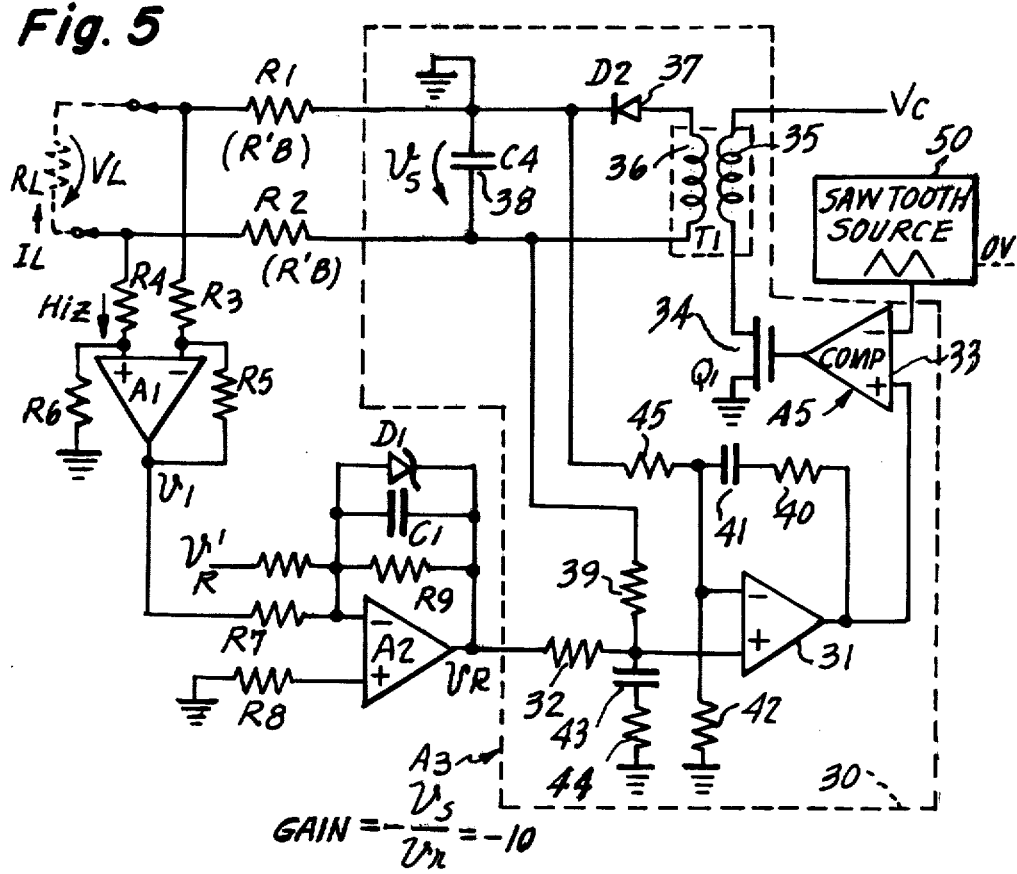

APPARATUS FOR REGULATING CURRENT SUPPLIED TO A TELEPHONE LINE SIGNAL OF THE TYPE EMPLOYED IN DIGITAL TELEPHONE SYSTEMS

BACKGROUND OF THE INVENTION

1. Field of the Invention

This invention relates generally to the supply of electrical current to a telephone subscriber loop and more particularly relates to apparatus for reducing power dissipation in such systems and for varying the subscriber line feed circuit characteristics without varying feed resistance value.

2. Description of the Prior Art

The prior art contains a number of patents descriptive of circuitry which attempts to provide a constant line current for telephone subscriber lines. Examples of such circuitry is provided by reference to U.S. Pat. Nos. 3,035,122; 3,916,110; 4,056,691; 4,007,335; 4,106,084. Essentially, the various circuits described in these prior art patents serve to maintain a constant or an efficient line current in a telephone subscriber loop, the length of which may vary and therefore whose resistance may vary depending upon the distance from the subscriber to the central office.

The line feed function associated with a classic telephone circuit is essentially equivalent to two resistors which are designated as line feed resistors in series with the central office battery. The value of the battery is in the range of 48 to 60 volts, and the resistors typically vary between 200 to 800 ohms depending upon the particular telephone exchange. The line feed resistors are selected at the central office of a value necessary to produce the proper line current versus loop resistance characteristics as expected by the telephone instrument. As is understood, a long telephone line indicates a large resistance, while a short line has a less resistance. The line feed resistors are placed in series with the telephone line and selected according to the desired loop current characteristics. In any event, these resistors dissipate a relatively large amount of power and cause thermal problems at the central office.

As indicated, certain of the systems of the prior art attempt to circumvent the power dissipation problem by providing a constant current to a telephone line relatively independent of the length of the line. However, such prior art systems suffer from other problems in that the circuitry which is located at the central office also dissipates large amounts of power and accordingly, are not capable of properly functioning with the typical variations of length found in modern day telephone systems.

It is, therefore, an object of the present invention to provide apparatus for reducing power dissipation in a telephone subscriber line interface circuit, while providing the required loop current versus loop resistance characteristics. The apparatus to be described functions to reduce the necessary power capacity required at a central office, while providing a circuit which eliminates the necessity of changing the value of telephone line feed resistors. In this respect, the apparatus allows one to utilize feed resistors of a relatively small value, while insuring that the proper current is supplied to a telephone line.

SUMMARY OF THE INVENTION

The present invention describes a line circuit for supplying a regulated loop current to a two conductor loop telephone line, said telephone line being connected between first and second subscriber terminals, said telephone line having an impedance which varies according to the length of said line and comprising first and second line feed resistors of approximately the same magnitude, said first resistor being coupled between one of said subscriber terminals and a reference potential. One terminal of the second resistor is coupled to the other subscriber terminal. A differential amplifier is provided having first and second input terminals, with the first input terminal coupled to the subscriber terminal associated with said first resistor, and the second input terminal coupled to the other subscriber terminal. The amplifier provides an output voltage having a predetermined first control signal, a reference source for providing a reference signal having a desired range of voltages which voltages can be supplied to a telephone line. A summing means is provided having a first and a second input with the first input being responsive to the first control signal and the second input being responsive to the reference signal to provide an output feedback control signal proportional to the sum of the reference signal and the control signal. An active circuit means having an input responsive to the feedback control signal provides at an output terminal thereof a voltage signal representative of the line current to be supplied to the telephone line, with the output terminal being coupled to the other terminal of the second line resistor whereby the desired line current flows through said resistor according to the feedback control signal and in turn, according to the length of said telephone line.

BRIEF DESCRIPTION OF THE DRAWINGS

FIG. 4 is a circuit diagram in greater detail illustrative of a line interface circuit in accordance with an embodiment of the present invention;

FIG. 5 is a circuit diagram of an alternate embodiment of a line interface circuit in accordance with the present invention.

DESCRIPTION OF THE PREFERRED EMBODIMENTS

Figure 1:
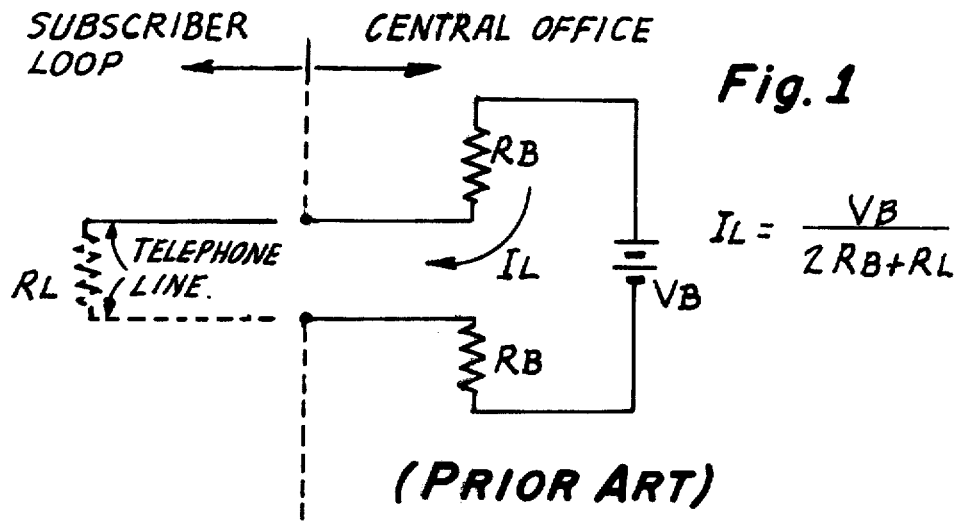
FIG. 1 is a circuit diagram of a classical telephone line feed circuit.

FIG. 1 illustrates a conventional telephone line feed circuit as is known in the prior art. A battery VB is located at the central office. The battery VB is nominally at a voltage of 48 to 60 volts and supplies power or line current to a subscriber's handset when a receiver in the subscriber loop goes off hook.

Since telephone subscribers are located at varying distances from the central office, there is shown a resistor RL which typifies the resistance of the telephone line. As the length of the line increases from the central office, the value of RL increases. In order to supply adequate loop current to a subscriber, the equivalent of two line feed resistors as RB are in series with the line and located at the central office. The values of the line feed resistors are typically within the range of 200 to 800 ohms depending upon the desired line current versus loop resistance characteristic desired. As one can ascertain, the resistors RB dissipate power and therefore create thermal problems at the switching office, as indicated above. The equation for the current IL in the circuit of FIG. 1 is shown to the right of FIG. 1 and is:

$$IL = VB/(2RB + RL)$$

Figure 2:
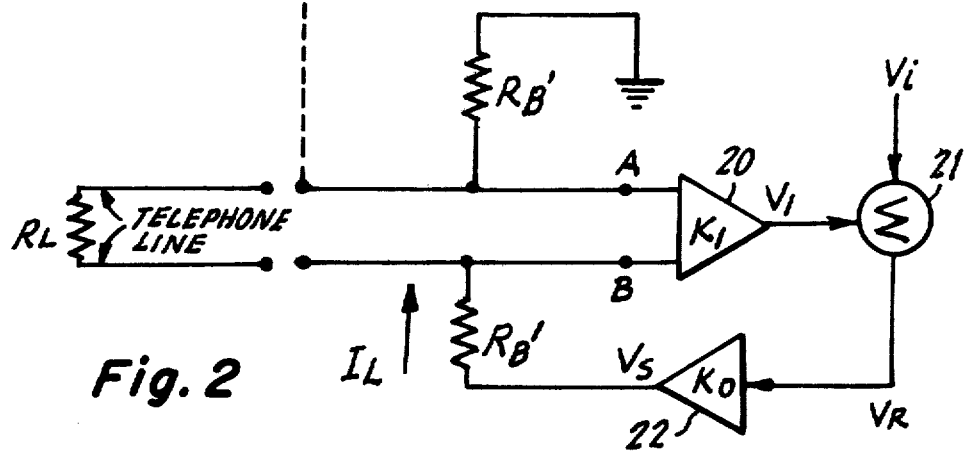
FIG. 2 is a simplified circuit diagram of a telephone line feed circuit in accordance with the present invention.

Referring to FIG. 2, there is shown an active equivalent circuit for a loop current and voltage source according to this invention. In FIG. 2, two resistors $RB^1$ and $RB^1$ are associated with each side of the telephone line. An amplifier 20 which is an operational amplifier has one input A coupled to the telephone line and directed to a point of reference potential through register $RB^1$. The gain of the amplifier is specified as K1. The other input B of amplifier 20 is directed to the other side of the telephone line. The output of amplifier 20 is coupled to an input of a summing network 21, having another input designated as $Vi$ and an output designated as VR. The output of the summing network 21 is applied to the input of amplifier 22 having a gain factor of Ko and an output designated as $V_S$. The output $V_S$ is coupled via a resistor $RB^1$ to the input terminal B of amplifier 20. As can be ascertained from FIG. 2, the equation for IL of FIG. 2 is:

$$IL = \frac{KoVi}{RL(1 - KoKi) + 2RB^1}$$

Figure 3:
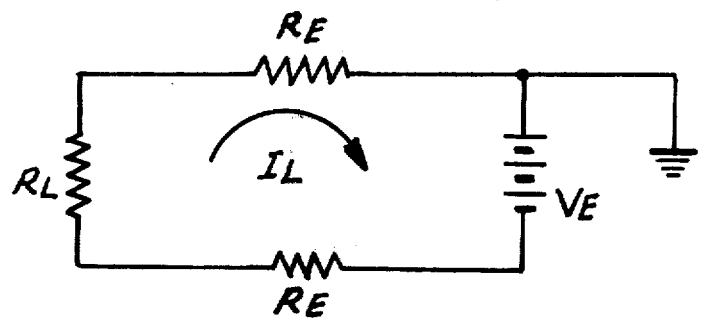
FIG. 3 is a circuit diagram useful in explaining the operation of the present invention.

The preceding equation represents the loop current expression for IL derived from the simple equivalent circuit of FIG. 2, and is equivalent to a circuit having a topology shown in FIG. 3.

As is apparent, the circuit shown in FIg. 1 and that in FIG. 3 have the same network topology and therefore, can be made identical. In FIG. 3, the following equations define the circuit parameters:

$$VE = \frac{KoVi}{1 - KoKi}$$

$$RE = \frac{RB^1}{1 - KoKi}$$

$$IL = \frac{VE}{RL + 2RE}$$

Therefore, with proper selection of circuit parameters (FIG. 2), one can assure that VE and RE are made equal to RB and VB, respectively.

By employing the circuit configuration shown in FIG. 2, one can implement the exact functions of the prior are circuit shown in FIG. 1 and hence, control line current IL according to the length of the line, while further assuring that the feed resistors as $RB^1$ (FIG. 2) are smaller in value than RB (FIG. 1) and hence, afford a substantial reduction in power dissipation over that of the prior art.

Referring to FIG. 4, there is shown a circuit diagram of apparatus for regulating the telephone line current IL by control of a voltage source $V_S$. In FIG. 4, conventional circuit designations have been employed in lieu of reference numerals to clarify the equations and in order to simplify the understanding of this invention.

In FIG. 4, one selects the components as follows:

$$R1 = R2 = RB^1$$

$$R3 = R4$$

$$R5 = R6$$

The voltage value Vi as shown has an input to the summing circuit 21 of FIG. 2 and is defined as:

$$Vi = \frac{R9}{R8} Vr^1$$

where $Vr^1$ is the voltage applied at resistor R8.

and K1 which is the gain of amplifier 20 of FIG. 2 is defined as:

$$K_1 = \frac{(R5)}{(R3)} \frac{(R9)}{(R7)}, \text{ then}$$

$$V_S = \frac{KoVi(2RB^1 + RL)}{2RB^1 + (1 - KoKi) RL}$$

$$IL = \frac{KoVi}{RL(1 - KoKi) + 2RB^1}$$

Hence, with the above components defined as indicated the load current IL and the voltage $V_S$ of FIG. 4 are identical to the load current IL and the voltage $V_S$ of FIG. 2.

Referring to FIG. 4, resistor RL is the equivalent DC loop resistance of the telephone as seen at the central office. The resistors R1 and R2 are the feed resistors and are equivalent to resistors $RB^1$. In this circuit, resistors R1 and R2 are selected to be smaller in magnitude than conventional line feed resistors and may be less than 200 ohms.

The telephone line is coupled to terminals a and b located at the central office. Terminal a is directed to a point of reference potential via the feed resistor R1 which has a value less than 200 ohms for low power dissipation. The junction of resistor R1 and terminal a is coupled to one input (inverting) of operational amplifier A1 via a series gain determining resistor R3. The amplifier A1 has a feedback resistor R5 coupled between the inverting input and the output. Amplifier A1 is a standard operational amplifier module available from many sources in integrated circuit form and any standard amplifier can be employed.

The amplifier A1 has its non-inverting input coupled via resistor R4 to the other terminal b associated with the telephone lines. This non-inverting input is directed to ground or to a point of reference potential via resistor R6, which by variation will also effect the gain of A1. Terminal b, as will be explained, is coupled through a line feed resistor R2 which is equal to R1 and hence, $RB^1$ to the output of an amplifier A3 which, as will be explained, operates to provide a variable voltage $V_S$ to the telephone line and for application to the non-inverting terminal of the amplifier A1. Amplifier A1 as shown in FIG. 4 is arranged in a differential amplifier configuration and performs the following functions:

The input to amplifier A1 as being coupled to the telephone line provides an isolation impedance and hence, the amplifier acts as a buffer between the telephone line and the control circuitry at the central station. Due to the differential operation, the amplifier A1 monitors the balanced telephone line input terminals a and b and converts the voltage across RL into a single ended voltage at the output terminal of A1. The values for resistors R3, R4, R5, and R6 are selected to provide a high input impedance as compared to resistors R1 and R2. The ratio of R4 to R6 and R3 to R5 are selected to provide operating characteristics for the amplifier to enable proper gain and DC biasing for the circuit.

The output of amplifier A1 is coupled via resistor R7 to the inverting (−) input terminal of operational amplifier A2. Amplifier A2 is a standard amplifier as well and could be implemented by the same integrated circuit configuration as employed for A1 or any other suitable circuit. Essentially, if an operational amplifier module is employed for A2, the non-inverting input (+) is directed to ground or to a source of reference potential.

As can be seen, the inverting input terminal of A2 is coupled via a resistor R8 to the potential source $VR^1$ as defined in the above equation and hence, a summing function is provided at this input terminal. The exact value for Vi can be obtained by changing either $VR^1$ or the ratio of resistors R8 and R9. Reistor R9 is the feedback resistor between the input and output terminals of A2. By specifying the gain of amplifier A2 according to K1 as defined by the above equations, one can implement a gain of K1 by adjusting the ratio of either R9 to R7 or R5 to R3 and R6 to R4. The gain K1 being determined by the combined cascaded gain of amplifiers A1 and A2.

By adjusting the ratio of R9/R7, one can achieve a simple gain control because the other ratios as indicated above, are normally dictated by a desired bias and the electrical parameters of amplifiers A1 and A2. The amplifier A2 also enables one to develop a programmable line feed characteristic through control of the voltage source.

Essentially, as will be explained, one employs a switch characteristic in this circuit to develop a proper voltage and hence, a proper current for the line circuit. Basically, the circuit operates to develop a switch voltage which is controlled according to the power requirements of the line circuit.

Shown in FIG. 4 is a feedback capacitor C1 which is directed between the input and output terminals of amplifier A2 and positioned across Zener diode. The capacitor C1 is selected to shape the frequency characteristics of the circuit and in this example, is selected so that all AC signals are filtered out. The Zener diode operates to shape the loop current, IL versus the loop resistance. The diode operates to limit the output voltage $V_S$ and to operate the circuit in a voltage source mode instead of a current regulated mode of operation. The technique of using a Zener in conjunction with an operational amplifier in this manner is known in the art.

It is, of course, understood that the combined functions of amplifiers A1 and A2 can be implemented in a single amplifier circuit as, for example, the amplifier 20 depicted in FIG. 2. However, this approach will not provide the great flexibility for the adjustments of circuit parameters as compared to employing two separate amplifiers as A1 and A2.

The output voltage at the output terminal of amplifier A2 is designated as VR and is the input to the amplifier A3. As seen from FIG. 4, the amplifier A3 is shown as a circuit module having an input coupled to the output of amplifier A2 and an output for developing the voltage $V_S$ as defined above and coupled via resistor R2 to terminal B of the telephone line. This amplifier delivers power to the telephone line and can be a standard operational amplifier in combination with a power stage to handle the necessary line current as required by the telephone line. However, as will be further explained, in order to achieve a maximum power savings, amplifier A3 is specified to be a high efficiency voltage variable power supply. Such a supply is designated as a DC/DC converter. Examples of DC/DC converters are well known in the art and such circuits provide an output voltage proportional to an input voltage related to the other by the constant −Ko. The use of a variable voltage power supply for amplifier A3 eliminates the voltage drops which would be provided by a standard amplifier circuit.

Thus, as can be seen from FIG. 4, the feedback module A3 can be a standard amplifier or can be a DC/DC converter in order to achieve additional savings in power consumption.

Referring to FIG. 5, there is shown the circuit of FIG. 4 with like components such as amplifiers A1 and A2 and the associated components and voltages designated by the same reference numerals. A dashed line 30 encloses a DC/DC converter which is employed as module A3 of FIG. 4.

Referring to the circuitry within the dashed line 30, there is shown an operational amplifier 31. Amplifier 31 has its non-inverting input coupled to the output of amplifier A2 via a series resistor 32. The output of amplifier 31 is coupled to the input of a comparator circuit 33. Comparator circuit 33 is a standard circuit and functions to compare a reference level applied to the inverting terminal with the voltage represented on the non-inverting terminal as coupled to the output of amplifier 31.

The output of the comparator circuit is directed to the gate electrode of FET 34. The source electrode of the FET 34 is coupled to a source of reference potential, while the drain electrode is coupled via the primary winding 35 of a transformer T1 to a source of operating potential designated as $V_C$.

Transformer T1, as will be explained, functions as a flyback transformer and an AC signal developed at the primary winding 35 is coupled to the secondary winding 36 where it is rectified by means of diode 37 which operates in conjunction with capacitor 38 to provide a voltage $V_S$ for application to the non-inverting terminal of amplifier A1. As is seen from FIG. 5, the cathode of the diode 37 is directed to ground or a point of reference potential and hence, the appropriate terminal of resistor R1 and capacitor C4 are also at this potential.

The voltage $V_S$ is applied through a series resistor 39 to the non-inverting terminal of amplifier 31, which terminal acts as a summing point. This terminal is directed to ground through a series of circuits consisting of a capacitor 43 in series with a resistor 44. The inverting terminal of amplifier 31 is coupled to ground via the resistor 45. A feedback network consisting of the series combination of resistor 40 and capacitor 41 is coupled between the input and output of the amplifier 31 to determine its gain and frequency characteristics.

Basically, the amplifier 31 is a standard operational amplifier which operates as in a differential configuration. The non-inverting input of amplifier 31 operates as the summing point to enable the amplifier to respond to the voltage $V_R$ and the voltage $V_S$. The amplifier serves as a buffer between the voltage $V_S$ and the control electronics associated with the central office. In this manner, the amplifier 31 produces an error signal at its output in order to control and specify the level of the voltage $V_S$. By proper selection of resistor 40 in series with capacitor 41, one can control the frequency characteristics of the circuit in order to provide stability.

The values of the resistors 39, 45, and 42 are selected to be relatively high to thereby afford minimum load on the output voltage $V_S$. The ratio of resistors 45 to 42 and the ratio of resistors 39 to 32 formed a balanced attenuator. The individual values are selected such that the maximum output voltage $V_S$ is consistent with the voltage range of the biasing for amplifier 31. Resistor 32 is the summing point which receives the reference signal via resistor 39 from the DC/DC converter. The resistors 32 and 44 as can be ascertained, serve to define the error amplification gain. Capacitor 41 and capacitor 43 are selected to shape the frequency characteristics of the circuit to provide stable operation.

As indicated, amplifier 33 is a comparator with its positive input connected to the output of the error amplifier 31. The negative input is connected to an externally generated triangular or sawtooth source 50 to develop a reference signal for the comparator 33. The comparison of the signals produces a pulse train at the output of the comparator. The frequency of the pulses is determined by the repetition rate of the sawtooth waveform and the width of each pulse changes as a function of the error voltage to therefore provide a pulse width modulated signal at the output of the comparator 33. As indicated, this signal is applied to the gate electrode of the field effect transistor 34 which switches on and off as a function of the duty cycle of the pulse train applied thereto. It is, of course, understood that a bipolar device can be employed in lieu of the field effect device to perform the switching function. Hence, transistor 34 turns on and off according to the duty cycle of the applied waveform.

As indicated, the transistor 34 is in series with the primary winding 35 of the transformer T1. When the transistor is pulsed on, energy is delivered to the magnetic field of the transformer from the power source $V_C$ at a rate determined by the inductance of the transformer and the value of the voltage source. The energy stored in the magnetic field for the duration of the on pulse is transferred to the secondary 36 of the transformer and stored in capacitor 38. The voltage across capacitor 38 is applied via resistor 39 to the input of amplifier 31. This action operates to close the loop for the circuit and due to the negative feedback mechanism, the output voltage $V_S$ is forced to be equal to a constant multiplied by the reference voltage $V_R$. In this case, $V_S = K_O \times V_R$. The DC converter contained in module 30 is therefore specified to have an effective loop gain of $-10$ and hence, the operating characteristics are thus specified.

A circuit was fabricated according to FIG. 5 employing a DC converter with an effective gain Ko equal to $-10$. The following values were employed:

FIRST EXAMPLE

| Component | Value |
|---|---|
| R1   R2 - $R_B^1$ | 100 ohms |
| R3, R4 | 200,000 ohms |
| R5, R6 | 20,000 ohms |
| R9 | 6,200 ohms |
| Zener D1 | 5.6 volts |
| R7 | 62,000 ohms |
| R8 | 93,000 ohms |

The circuit with the above values supplied a constant of 42 MA to the telephone line impedance RL upon variation of RL from zero to 1,100 ohms. For values of RL greater than 1,100 ohms, the current IL was determined by the equation below:

$$IL = \frac{52V}{200 + RL}$$

In a second example, the above values were as indicated with the exception that R7 was made equal to 8,198 ohms and R8 was 62,960 ohms. In this example, loop currents with loop resistance characteristics were duplicated to be equivalent to a conventional feed having two line feed resistors equal to 400 ohms and a 48 volt battery. The effective loop current in this case was defined by the following example:

$$IL = \frac{48}{800 + RL}$$

The capacitor C1 in the feedback circuit with amplifier A2 was selected to eliminate any AC signal interference and the magnitude was a function of the particular type of operational amplifier configuration selected for components A1 and A2.

As above indicated, there has been described a circuit for providing a regulated load current to a telephone line. The circuit enables a desired current to be fed to the line by selectively switching a gain constant contained in a feedback loop. In this manner, one can use low value line feed resistors and achieve a substantial savings in power dissipation over the conventional line circuits which are employed in the prior art.

As can be seen from the above described configurations, the circuit shown possesses the ability to implement the conventional line circuit as depicted in FIG. 1, but further serves to have the ability to control and regulate the line current IL by means of controlling a voltage source as shown in FIGS. 2, 4 and 5.

It is also understood that one could implement the above described functions by the use of controlled switches which would be synchronously controlled from a suitable reference frequency source and which would operate in conjunction with a summing network to selectively apply signals to the operational amplifier as A2 of FIG. 4. In this manner, one can therefore generate the signal $V_R$ for application to the active feedback control circuit A3 of FIG. 4 and FIG. 5.

While the present invention has been described in connection with a preferred embodiment thereof, it is to be understood that additional embodiments, modifications and applications which will become obvious to those skilled in the art are included within the spirit and scope of the invention as set forth by the claims appended hereto.

I claim:

1. A line circuit for supplying a regulated loop current to a two-wire telephone subscriber line, said telephone line connected between first and second terminals at a subscriber set, said telephone line having an impedance which varies according to the length of said line, comprising:
   first and second line feed resistances of substantially the same magnitude, said first resistance coupled between one of said wires and a point of reference potential, with one terminal of said second resistance coupled to said other of said wires;
   differential amplifier means having first and second input terminals, with said first input terminal coupled to said wire associated with said first resistance and said second input terminal coupled to said other wire, said amplifier providing an output voltage manifesting a predetermined first control signal;

DC reference source for providing a reference signal which can be supplied to a telephone line;

summing means having a first and a second input with said first input responsive to said first control signal and said second input responsive to said reference signal to provide an output feedback control signal proportional to the sum of said reference signal and said control signal; and active circuit means having an input responsive to said feedback control signal to provide at an output terminal a voltage signal indicative of a line current to be supplied to said telephone line, with said output terminal coupled to said other terminal of said second line resistance, whereby the current flows through said resistance according to said feedback control signal and therefore according to the length of said subscriber line to provide a range of voltages to said subscriber line.

2. The line circuit according to claim 1, wherein said summing means comprises an amplifier having an input terminal with a first impedance coupled between said input terminal and said output terminal of said differential amplifier means and a second impedance coupled between said reference source and said input terminal to provide at the output of said amplifier said feedback control signal.

3. The line circuit according to claim 2, wherein said active circuit means comprises a DC/DC converter having an input terminal adapted to receive said output feedback control signal to develop a pulse width modulated output signal according to said feedback control signal, and means responsive to said output signal and coupled to said other terminal of said second line resistance for providing said desired line current.

4. The line circuit according to claim 3, wherein said DC/DC converter further comprises:
an input amplifier having an input summing terminal responsive to said feedback control signal and said line current, and an output terminal for providing an error signal indicative of the difference of said feedback control signal and said desired line current;
comparison means having one input terminal responsive to said error signal and a second input terminal coupled to a repetitive reference waveform signal source for providing at an output a pulse train of a frequency in accordance with that of said repetitive waveform and a pulse width according to said error signal; and
switching means including a transformer responsive to said pulse train to develop an output signal indicative of said voltage signal to be supplied to said telephone line and means for applying said output signal to said other terminal of said second line resistance.

5. The line circuit according to claim 4, wherein said repetitive signal waveform source provides a sawtooth reference signal.

6. The line circuit according to claim 2, further including:
means coupled between the output and input terminals of said amplifier to control the frequency response of said line circuit.

7. The line circuit according to claim 1, wherein said differential amplifier means comprises an operational amplifier having a first inverting input terminal coupled to said subscriber terminal associated with said first resistance and a second non-inverting input terminal coupled to said other subscriber terminal, said operational amplifier having an output terminal for providing said signal manifesting said first control signal and means coupled between said output terminal and said first inverting input terminal for specifying the gain of said amplifier.

8. The line circuit according to claim 1, wherein said active circuit means comprises an amplifier having an input terminal responsive to said feedback control signal and an output terminal coupled to said other terminal of said second line resistance.

9. The line circuit according to claim 1, wherein said first and second resistances have a magnitude of less than 200 ohms and each designated as $RB^1$ with said differential amplifier means having a gain factor of $K_1$, with said reference signal providing at output signal designated as $V_i$, and said output feedback control signal designated as $V_R$, with said active circuit means having a loop gain designated as $K_O$ to provide said voltage signal designated as $V_S$ where said line current $IL$ as flowing in said second resistance $RB^1$ is determined according to the following equation:

$$IL = \frac{K_O V_i}{RL(1 - K_O K_1) + 2RB^1}$$

where, RL is equal to the resistance of said telephone line.

10. The line circuit according to claim 1, further including:
means coupled to said differential amplifier means to remove any AC signals from said line circuit.

11. A current regulation circuit for supplying regulated current to a two-wire analog subscriber line, comprising:
first and second line feed impedance elements of substantially the same magnitude, said first impedance element being coupled between one of the wires of said analog line and to a reference potential, and said second impedance element being connected to the other wire of said analog line and to a control terminal;
differential amplifier means coupled to said two-wire line for generating an output control voltage;
reference source means for providing a reference signal to be coupled to said two-wire line;
summing means having said output control voltage and said reference signal coupled thereto for generating a feedback control signal proportional to the sum of said reference signal and said output control voltage; and
means responsive to said feedback control signal for providing a signal indicative of the line current to be supplied to said subscriber line, said signal being coupled to said control terminal of said second impedance element, such that the current coupled to said second resistance is selected in accordance with said feedback control signal and in accordance with the impedance characteristic of said two-wire line to selectively provide a predetermined range of voltages to said two-wire line.

* * * * *